United States Patent
Hashimoto et al.

(10) Patent No.: US 12,164,876 B2
(45) Date of Patent: Dec. 10, 2024

(54) INTERACTIVE SYSTEM

(71) Applicant: NTT DOCOMO, INC., Chiyoda-ku (JP)

(72) Inventors: Takanori Hashimoto, Chiyoda-ku (JP); Yuriko Ozaki, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 362 days.

(21) Appl. No.: 17/611,203

(22) PCT Filed: Jan. 23, 2020

(86) PCT No.: PCT/JP2020/002404
§ 371 (c)(1),
(2) Date: Nov. 15, 2021

(87) PCT Pub. No.: WO2020/235136
PCT Pub. Date: Nov. 26, 2020

(65) Prior Publication Data
US 2022/0229996 A1     Jul. 21, 2022

(30) Foreign Application Priority Data

May 20, 2019 (JP) .............................. 2019-094533

(51) Int. Cl.
*G06F 16/903* (2019.01)
*G06F 40/247* (2020.01)
(Continued)

(52) U.S. Cl.
CPC ........ *G06F 40/35* (2020.01); *G06F 16/90335* (2019.01); *G06F 40/247* (2020.01);
(Continued)

(58) Field of Classification Search
CPC .................... G06F 40/247; G06F 16/90335
See application file for complete search history.

(56) References Cited

U.S. PATENT DOCUMENTS 8,055,669 B1 * 11/2011 Singhal .............. G06F 16/3322
707/765
10,810,215 B2 * 10/2020 Murdock, IV .......... G06F 40/30
(Continued)

FOREIGN PATENT DOCUMENTS

JP     2015-36945 A     2/2015

OTHER PUBLICATIONS

International Preliminary Report on Patentability issued Dec. 2, 2021 in PCT/JP2020/002404 (submitting English translation only), 6 pages.
(Continued)

*Primary Examiner* — Thomas H Maung
(74) *Attorney, Agent, or Firm* — Oblon, McClelland, Maier & Neustadt, L.L.P.

(57) ABSTRACT

The purpose of the present invention is to provide an interactive system that allows addition of appropriate response content. An interactive system 100 includes a history DB 105b that stores search history information containing an acquired key, which is a keyword acquired from an input sentence acquired by user operation, a new candidate key, which is an unknown word, and a query sentence, which is response content retrieved using the acquired key. A query sentence generation unit 109 generates a new query sentence on the basis of the search history information, by using a search key contained in the query sentence and the new candidate key.

15 Claims, 10 Drawing Sheets

(51) Int. Cl.
  *G06F 40/279* (2020.01)
  *G06F 40/35* (2020.01)
  *G06F 40/40* (2020.01)
  *G06N 5/04* (2023.01)
  *G06F 40/166* (2020.01)

(52) U.S. Cl.
  CPC ............ *G06F 40/279* (2020.01); *G06F 40/40* (2020.01); *G06N 5/04* (2013.01); *G06F 40/166* (2020.01)

(56) References Cited

U.S. PATENT DOCUMENTS

| | | | |
|---|---|---|---|
| 11,049,493 B2* | 6/2021 | Hiroe | G10L 13/00 |
| 2016/0078020 A1* | 3/2016 | Sumita | G06F 40/157 |
| | | | 704/9 |
| 2018/0068657 A1* | 3/2018 | Khan | G10L 15/063 |
| 2019/0164537 A1* | 5/2019 | Oyaizu | G10L 15/08 |

OTHER PUBLICATIONS

International Search Report mailed on Apr. 14, 2020 in PCT/JP2020/002404 filed on Jan. 23, 2020 (3 pages).

* cited by examiner

Fig. 2

(a)
QUERY SENTENCE DB

| QUERY SENTENCE | SEARCH KEY | ANSWER |
|---|---|---|
| EMAIL IS ERROR | EMAIL, ERROR | ADDRESS IS CORRECT? |
| | | |
| | | |

(b)
HISTORY DB

| INPUT SENTENCE | ACQUIRED KEY | SEARCH UNUSED KEY | SEARCH USED KEY | NEW CANDIDATE KEY | QUERY SENTENCE | DIFFERENTIAL KEY |
|---|---|---|---|---|---|---|
| UNABLE TO SEND EMAIL WITH PHOTO | EMAIL | WITH PHOTO | EMAIL | UNABLE TO SEND | EMAIL IS ERROR | ERROR |
| | | | | | | |
| | | | | | | |

INTERACTIVE SYSTEM

TECHNICAL FIELD

The present invention relates to an interactive system that interacts with a user.

BACKGROUND ART

The following Patent Literature 1 includes a description about a question-answering control program for controlling output of an answer to a question described in a natural sentence to avoid the possibility of selecting an answer that is inconsistent with the intent of a question from a customer and efficiently processing narrowing down an answer.

CITATION LIST

Patent Literature

PTL1: Japanese Unexamined Patent Publication No. 2015-36945

SUMMARY OF INVENTION

Technical Problem

In the technique of performing a keyword-based search process described in Patent Literature 1, it is important to extend a keyword in order to appropriately acquire a keyword from a user's input and adds an answer candidate according to the extension. However, if an answer candidate is added according to the keyword extension, there may be an inappropriate answer candidate, which can lead to an answer that is not consistent with the purpose.

To solve the above problem, an object of the present invention is to provide an interactive capable of adding appropriate response content.

Solution to Problem

An interactive system according to the present invention includes an acquisition unit configured to acquire an acquired key being a keyword acquired from an input sentence acquired by user operation, a new candidate key being an unknown word, and response content retrieved using the acquired key, and a generation unit configured to generate new response content on the basis of a search key contained in the response content and the new candidate key.

The present invention enables addition of appropriate response content with use of a search key and a new candidate key. The number of interactions is thereby reduced.

Advantageous Effects of Invention

The present invention allows adding appropriate response content and thereby reduces the number of interactions.

BRIEF DESCRIPTION OF DRAWINGS

FIG. 2 is a view showing specific examples of a query sentence DB 105*a* and a history DB 105*b*;

DESCRIPTION OF EMBODIMENTS

Embodiments of the present invention are described hereinafter with reference to the attached drawings. Note that, where possible, the same elements are denoted by the same reference symbols and redundant description thereof is omitted.

Figure 1:
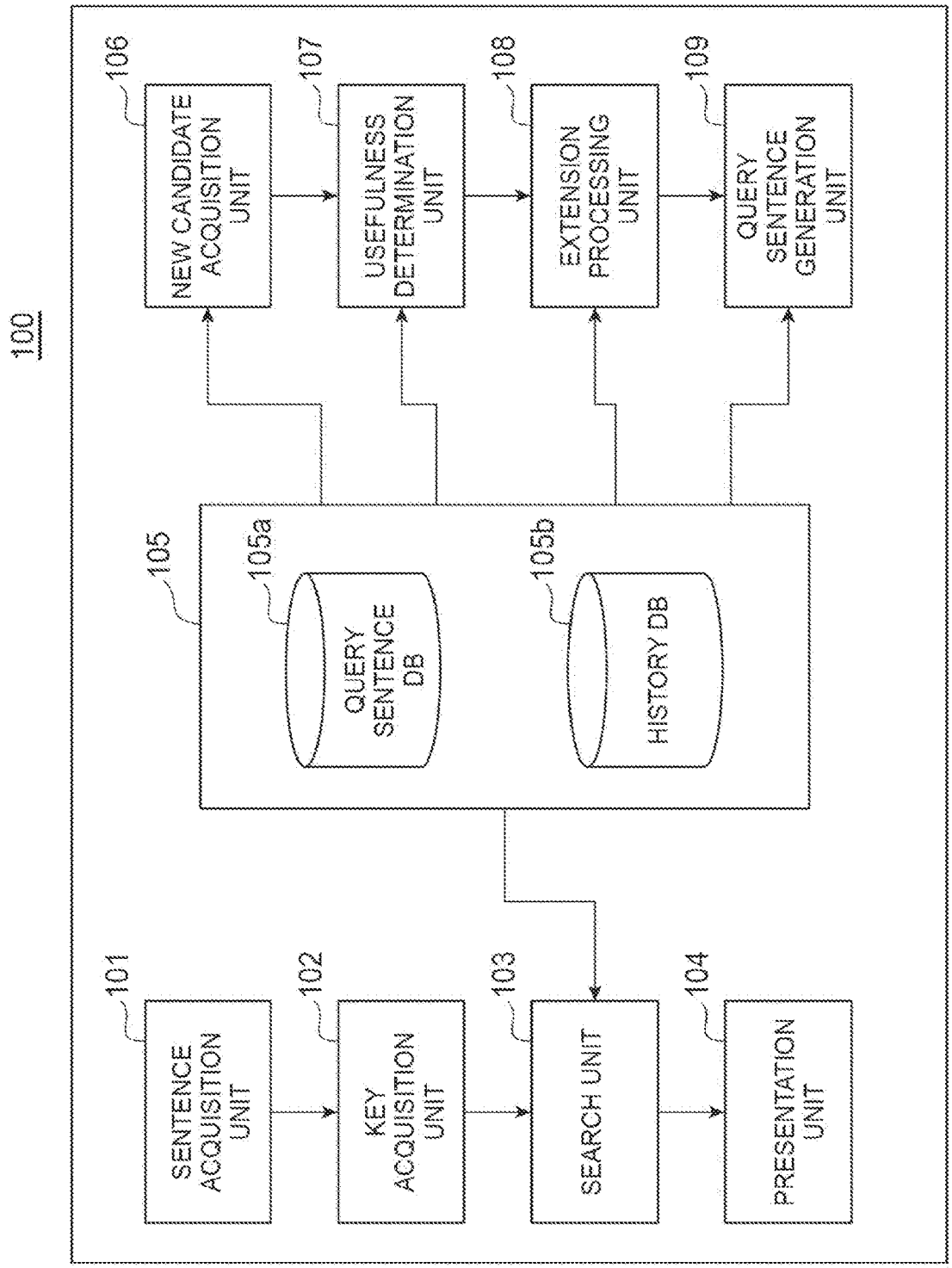
FIG. 1 is a block diagram showing a functional configuration of an interactive system 100 according to an embodiment.

FIG. 1 is a block diagram showing functions of an interactive system 100 according to an embodiment. The interactive system 100 is a system that interacts and responds to a sentence input by a user. The interactive system 100 according to this embodiment functions as an FAQ system, and presents a query sentence and an answer desired by a user through interaction (presenting search results and providing instructions in response thereto) on the basis of a sentence input by a user.

As shown in FIG. 1, the interactive system 100 includes a sentence acquisition unit 101, a key acquisition unit 102, a search unit 103, a presentation unit 104, a storage unit 105, a new candidate acquisition unit 106, a usefulness determination unit 107, an extension processing unit 108, and a query sentence generation unit 109.

The sentence acquisition unit 101 is a part that acquires an input sentence that is input by a user. The sentence acquisition unit 101 may acquire an input sentence transmitted from a user terminal operated by a user via a network or may acquire an input sentence input directly through a keyboard or the like.

The key acquisition unit 102 is a part that performs known natural language processing such as morphological analysis on an input sentence and thereby splits the sentence into words, and then acquires, from the split words, a key that is registered in a key DB (not shown) as an acquired key. The key DB is a database that extracts keys, which are words, by performing morphological analysis or the like on query sentences in advance. The key acquisition unit 102 acquires a new candidate key, which is an unknown word, in addition to the acquired key. The new candidate key is a key that is not registered in the key DB.

The acquired key includes a search used key and a search unused key, and the search used key is a key that is used for query sentence search, which is described later. The search unused key is a key that has not been used for query sentence search. The interactive system 100 performs a process of searching for query sentences through interaction with a user and narrowing them down. Thus, there can be a key that has not been used when obtaining a final query sentence.

The search unit 103 is a part that refers to a query sentence DB 105*a* and searches for a query sentence by using the acquired key acquired by the key acquisition unit 102.

The presentation unit 104 is a part that presents, to a user, a query sentence retrieved by the search unit 103 as a query sentence candidate. The presentation may be done by transmitting the query sentence to a user terminal of a user via network or by displaying the query sentence on a display or the like. The presentation unit 104 stores the finally presented query sentence, the search used key used in search, the search unused key not used in search, the new candidate key and the like as search history information into a history DB 105*b*.

The search unit 103 and the presentation unit 104, in cooperation with each other, sequentially present a plurality of retrieved query sentences to a user and receive a user instruction (whether it is right or wrong) in response to it, thereby carrying out interaction. The search unit 103 and the presentation unit 104 then narrow them down to one or several query sentences.

The storage unit 105 stores the query sentence DB 105*a* and the history DB 105*b*. As shown in FIG. 2(*a*), the query sentence DB 105*a* describes a query sentence, which is a search target, a search key that is used for search of a query sentence and contained in this query sentence, and an answer to the query sentence. In this embodiment, a new query sentence is added to the query sentence DB 105*a* as described later.

The history DB 105*b* is a part that stores information used by a user for search of a query sentence. As shown in FIG. 2(*b*), the history DB 105*b* describes an input sentence, an acquired key, an unused key, a new candidate key, a reached query sentence, a search used key used for search in association with one another.

The new candidate acquisition unit 106 is a part that acquires a search used key, a search unused key, a new candidate key, and a query sentence (a query sentence to be edited) corresponding to it by referring to the history DB 105*b*.

The usefulness determination unit 107 is a part that determines the usefulness of a new candidate key by referring to the history DB 105*b*. In this embodiment, the usefulness of a new candidate key is determined on the basis of whether the new candidate key has relevance to a differential key, which is described later, whether the frequency of reaching a differential key from the new candidate key is equal to or more than a specified number, or the like. The detailed determination is described later with reference to the drawings.

Further, the usefulness determination unit 107 performs data analysis by referring to the query sentence DB 105*a* or the key DB and thereby determines linguistic relevance, a category and the like. Further, the usefulness determination unit 107 has data (corpus) for natural language processing according to need and is thereby capable of determining linguistic relevance also. For example, it is capable of determining whether dependency of words is the same or not. The extension processing unit 108 is a part that determines an extension method for a query sentence to be edited. For example, the extension processing unit 108 is a part that determines, according to content determined to be useful, whether to perform a method of replacing a part of the query sentence to be edited with a new candidate key determined to be useful, a method of adding a new candidate key to the query sentence to be edited, or a method including both of them. For example, when a new candidate key is a quasi-synonym of a differential key, the extension processing unit 108 determines that the new candidate key is useful, and in this case, replaces the differential key and the new candidate key, and thereby generates a query sentence. Prior to this processing, the extension processing unit 108 associates content to be determined to be useful with a method of query sentence generation in advance.

The query sentence generation unit 109 is a part that generates a new query sentence from the query sentence to be edited according to the determined extension method. In the generation, a postpositional particle or the like may be changed as appropriate according to the meaning or content of a new candidate key. Note that the query sentence generation unit 109 performs the same generation process when there is the same new candidate key in the same domain (category) besides the query sentence to be edited. To perform this process, the query sentence DB 105*a* or the history DB 105*b* stores a domain in association with a query sentence.

The query sentence generation unit 109 registers the generated new query sentence in the query sentence DB 105*a*. This enables interaction using the new query sentence. The query sentence generation unit 109 newly generates a search key corresponding to the new query sentence by referring to the key DB or the like. Further, a search key associated with the query sentence to be edited is partly usable. Furthermore, an answer corresponding to the query sentence to be edited is linked to an answer corresponding to the new query sentence.

Figure 3:
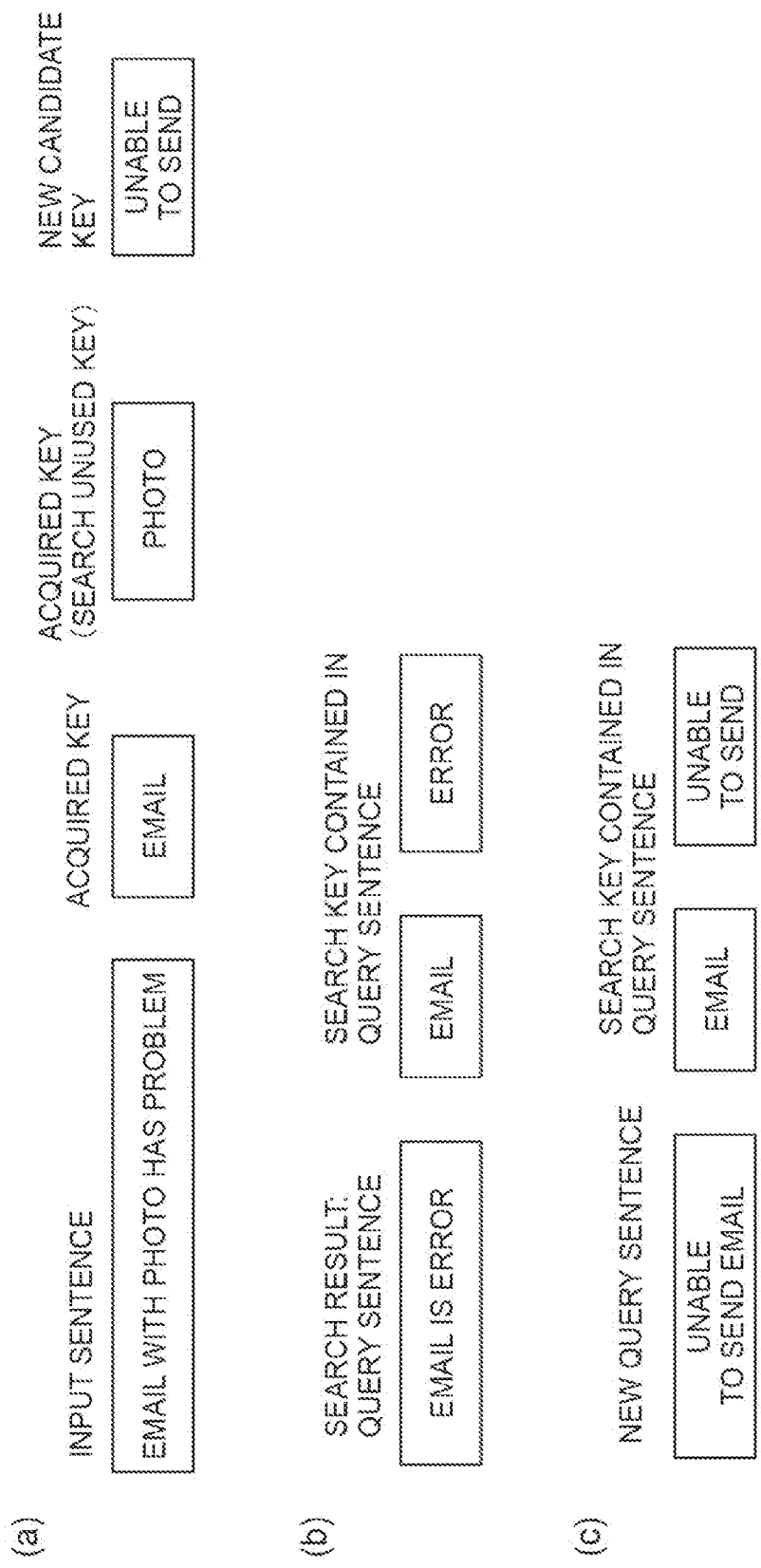
FIG. 3 is a view schematically showing a new query sentence generation process.

A new query sentence generation process according to this embodiment is described hereinafter. FIG. 3 is a view schematically showing a new query sentence generation process. FIG. 3(*a*) shows an input sentence, an acquired key, and a new candidate key.

In query sentence search, the key acquisition unit 102 acquires an acquired key and a new candidate key from an input sentence, and the search unit 103 and the presentation unit 104 search for a query sentence on the basis of the acquired key, present a search result (query sentence candidate) to a user, and asks whether it is a query sentence that is aligned with the user's intention. When a query sentence is finally reached after repeating interaction that repeatedly performs search and presentation, the presentation unit 104 stores the input sentence, the acquired key, the search unused key, the new candidate key, the query sentence, and the search used key into the history DB 105*b*.

In FIG. 3(*a*), the key acquisition unit 102 acquires, from the input sentence "unable to send email with photo", the acquired key "email", the acquired key "photo", and the new candidate key "unable to send". Then, in FIG. 3(*a*), the acquired key "photo" is sorted as the search unused key, which is a key not used in search. It is hereinafter referred to as the search unused key "photo".

FIG. 3(*b*) shows a search result and search keys associated with this retrieved query sentence. In FIG. 3(*b*), the search result: query sentence "email is error" is acquired according to the interaction (the search unit and the presentation unit) by the interactive system 100.

Then, the input sentence, the acquired key, the search unused key, the new candidate key, the query sentence, and the search used key that are used for this search are stored into the history DB 105*b*.

FIG. 3(*c*) shows a new query sentence that is newly generated and search keys contained in this query sentence. In this example, the new query sentence "unable to send email" and the search keys "email" and "unable to send" are generated. The query sentence generation unit 109 refers to the history DB 105b and extracts a query sentence to be edited, and edits it by using a corresponding search unused key or the like, and thereby generates the new query sentence.

In FIG. 3(c), the query sentence generation unit 109 acquires the search result: query sentence "email is error" stored in the history DB 105b as the query sentence to be edited (FIG. 3(b)). Then, the query sentence generation unit 109 adds the new candidate key "unable to send" stored in the history DB 105b instead of the search key "error", and thereby generates the new query sentence "unable to send email".

Figure 4:
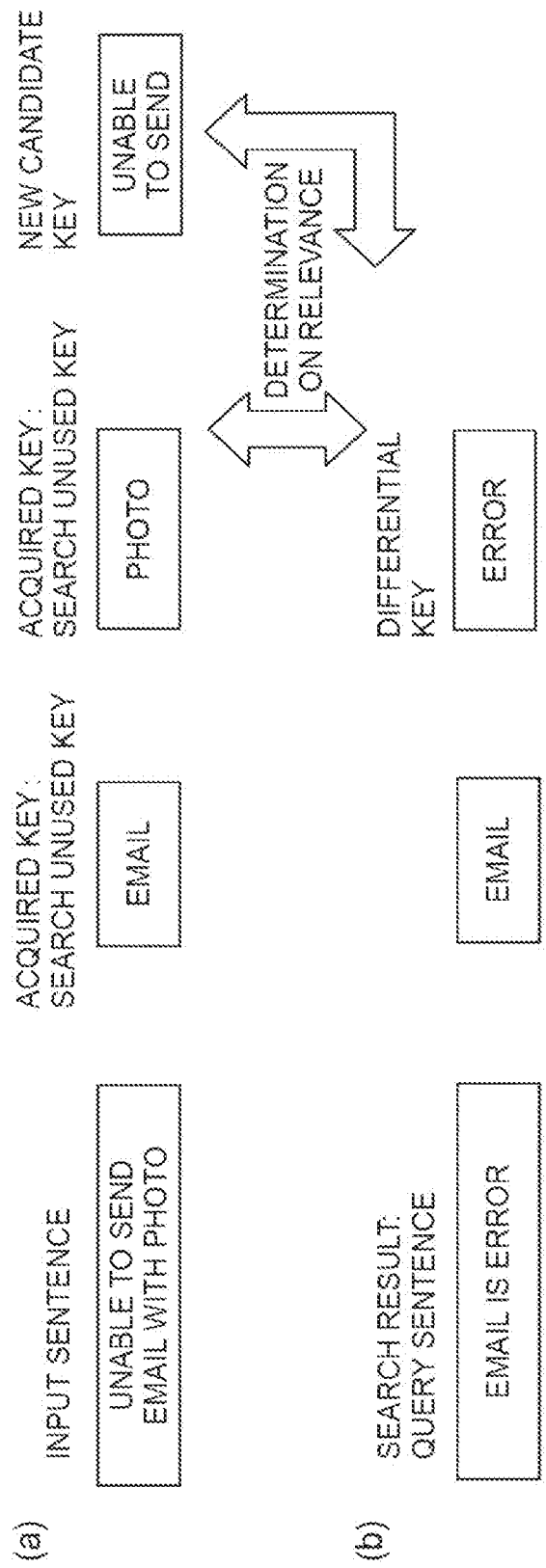
FIG. 4 is a view showing a specific process related to addition of a new candidate key.

A specific process related to the addition of the new candidate key is described hereinafter with reference to FIG. 4. FIG. 4(a) shows the input sentence "unable to send email with photo", the acquired key "email", the search unused key "photo", and the new candidate key "unable to send". FIG. 4(b) shows the search result: query sentence candidate "email is error" retrieved on the basis of the acquired key, and the search keys "email" and "error" contained in this query sentence.

The usefulness determination unit 107 acquires, as a differential key, a key not contained in the input sentence among the search keys in the query sentence retrieved as a search result. The usefulness determination unit 107 then determines the relevance between the differential key and each of the search unused key and the new candidate key. In FIG. 4, since the search key "error" is a key that is not contained in the input sentence, the usefulness determination unit 107 sets it as the differential key "error". After that, the usefulness determination unit 107 determines each of the relevance between the differential key "error" and the search unused key "photo" and the relevance between the search key "error" and the new candidate key "unable to send".

In this example, the usefulness determination unit 107 determines that the new candidate key "unable to send" is a similar word of the differential key "error" and therefore determines that there is relevance. On the other hand, since the search unused key "photo" and the differential key "error" are none of inconsistent spelling, a similar word and a synonym, the usefulness determination unit 107 determines that there is no relevance.

Note that, the relevance may be determined on the basis of a distance in words between a differential key and a new candidate key, besides inconsistent spelling or the like. The distance in words is calculated on the basis of the distance of a feature vector of a word. This is known art, and Word2Vec or the like is known, for example.

The query sentence generation unit 109 generates a new query sentence by using the new candidate key that is determined to have relevance by the usefulness determination unit 107.

Figure 5:
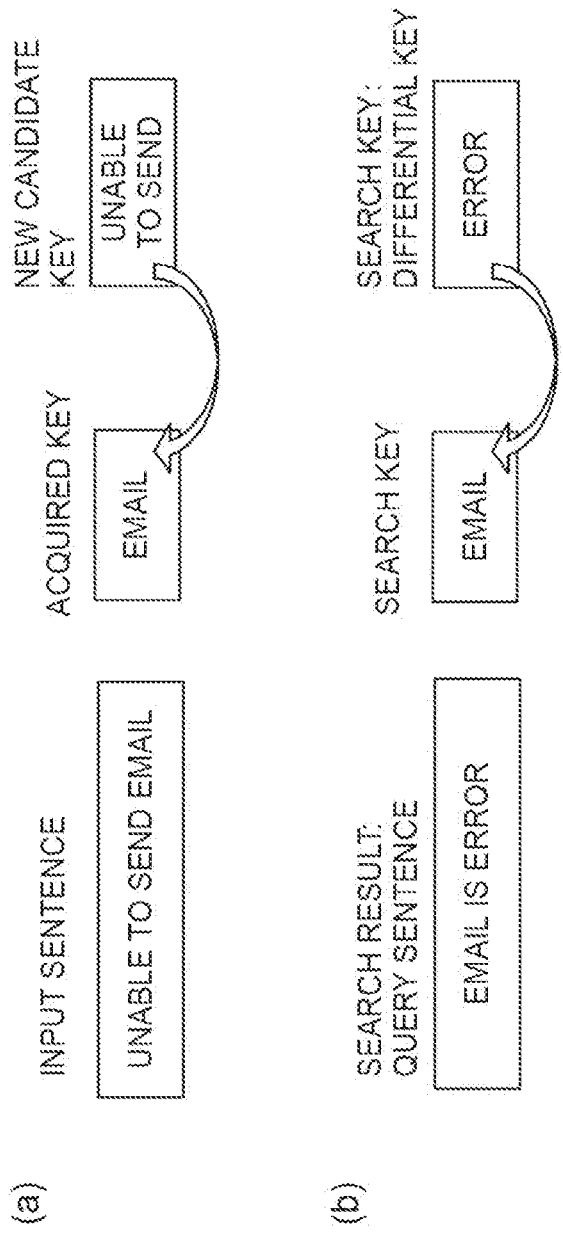
FIG. 5 is a view schematically showing a determination process in consideration of the dependency of a search key and a new candidate key.

FIG. 5 is a view schematically showing a process of determining the relevance between a search key and a new candidate key in consideration of dependency. As shown therein, the usefulness determination unit 107 determines whether the acquired key "email" and the new candidate key "unable to send" in the input sentence and the search key "email" and the differential key "error" in the query sentence as a search result have the same dependency or not. In the example of FIG. 5, the usefulness determination unit 107 determines that the both keys are terms describing the state of "email" by using data (corpus etc.) for natural language processing, and thereby determines that they have the same dependency.

Figure 6:
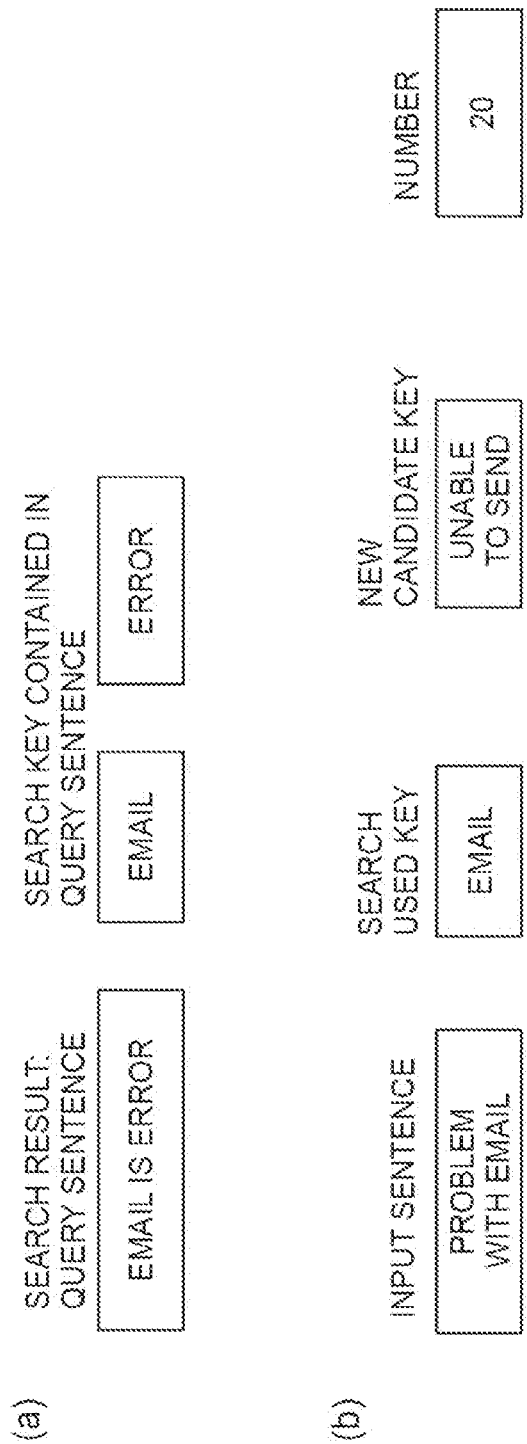
FIG. 6 is a view showing determination of the usefulness of a new candidate key on the basis of the frequency of reaching a target query sentence.

FIG. 6 is a view showing determination of the usefulness of a new candidate key on the basis of the frequency of reaching a target query sentence. FIG. 6(a) shows the search result: query sentence and its search keys. In this figure, the query sentence "email is error" and the search keys "email" and "error" are shown.

FIG. 6(b) shows the input sentence (including the search used key and the new candidate key) and the frequency of reaching the query sentence of FIG. 6(a) from this input sentence. In FIG. 6(b), the frequency is 20. The usefulness determination unit 107 refers to the history DB 105b and extracts one query sentence to be edited from search results, and acquires a new candidate key corresponding to this query sentence. Then, the number that this new candidate key is registered in the history DB 105b is counted.

For example, the usefulness determination unit 107 selects, from the history DB 105b, one query sentence "email is error" as a query sentence to be edited, and acquires the new candidate key "unable to send" corresponding thereto. Then, the number that this new candidate key "unable to send" is registered in the history DB 105b is counted. This number corresponds to the frequency that one query sentence "email is error" is reached from each of the input sentence containing the new candidate key "unable to send".

When this frequency is equal to or more than a specified number, the usefulness determination unit 107 determines that the new candidate key in this input sentence is useful. Then, the query sentence generation unit 109 generates a new query sentence on the basis of this new candidate key and one query sentence to be edited. Note that, when determining the usefulness, the input sentence is not necessarily the same. The usefulness of the new candidate key can be determined on the basis of the frequency that the search key in the finally reached query sentence and the new candidate key of the input sentence from which this query sentence is generated match.

Besides the frequency, when the percentage of the number of searches where the same query sentence is reached relative to the frequency of the same input sentence (or the same new candidate key) is equal to or more than a certain percentage, the new candidate key of this input sentence can be determined to be useful.

Further, the usefulness of the new candidate key may be determined on the basis of the frequency of replacements of the new candidate key when the query sentence is reached. For example, the usefulness determination unit 107 selects, from the history DB 105b, one search result, the query sentence "email is error", to be edited. It then acquires the input sentence "unable to send email" containing the corresponding acquired key "email" and the new candidate key "unable to send", and its differential key "error".

The usefulness determination unit 107 focuses attention only on this differential key "error", and counts the number of records containing the differential key "error" from the new candidate key "unable to send" in the history DB 105b.

The cases where a new candidate key is replaced with a differential key include the case where the search result: query sentence "email is error" is reached from the input sentence "unable to send email", the case where the search result: query sentence "WiFi is error" is reached from the input sentence "unable to send email" and so on, for example.

In this example, it is assumed that there is a case where the query sentence "email is error" is reached 20 times as a search result, and there is a case where the query sentence "WiFi is error" is reached 10 times as another search result.

In this case, the usefulness determination unit 107 counts the frequency that the new candidate key "unable to send" is replaced with the differential key "error" as 30.

Using this new candidate key, the query sentence generation unit 109 generates a new query sentence on the basis of the query sentence to be edited.

In this manner, the usefulness of a new candidate key may be determined on the basis of the total number of times when the new candidate key is replaced by focusing only on the new candidate key without giving consideration to another acquired key. In the above case, when the replacement has occurred with a specified frequency or more, such as 30 times or more, for example, the new candidate key that is replaced is determined to be effective.

Further, the query sentence generation unit 109 may extract a query sentence associated with the differential key "error" as a query sentence to be edited, and generate a new query sentence on the basis of this query sentence.

Figure 7:
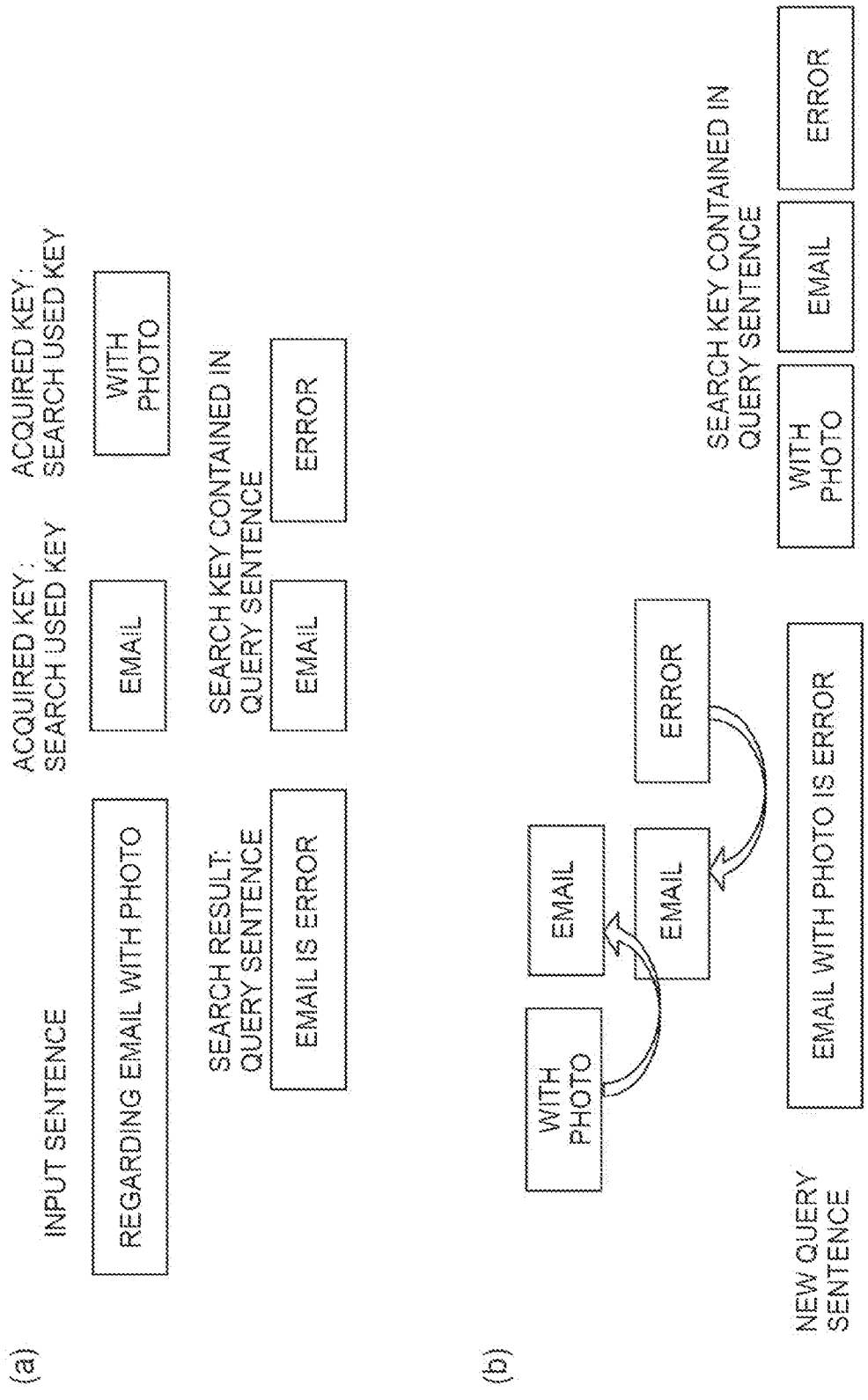
FIG. 7 is a schematic view showing a new query sentence generation process using a search unused key.

Next, a process of generating a new query sentence using a search unused key is described hereinafter. FIG. 7 is a schematic view showing a new query sentence generation process using a search unused key. As shown in FIG. 7(*a*), the acquired keys "email" and "with photo" are acquired from the input sentence "regarding email with photo". The search used key "email" is a key used in search, and the search unused key "with photo" is a key not eventually used in search for a query sentence.

Then, in this example, it is assumed that the query sentence "unable to send email" is reached as a search result. With this query sentence, the search keys "email" and "unable to send" are associated.

FIG. 7(*b*) shows generation of a new query sentence using the search unused key "with photo". When the search unused key "with photo" does not compete with another search key in terms of dependency, a new query sentence using this search unused key is generated.

For example, the dependency between the search key "unable to send" and the search key "email" in the query sentence "unable to send email" is such that the search key "email" is explained using the search key "unable to send". When it is determined that the dependency relationship between the answer unused key "with photo" and the search key "email" is not such dependency, and when other dependency is possible between the answer unused key "with photo" and the search key "email", a new query sentence using the answer unused key is generated.

In the example of FIG. 7(*b*), since the dependency where the answer unused key "with photo" is a modifier of "email" is possible, the new query sentence "unable to send email with photo" is generated. Further, at this time, "with photo", "email", and "unable to send" are acquired as the search keys and registered in the query sentence DB 105*a*.

The technical process is as follows. When generating a query sentence, the query sentence generation unit 109 acquires a query sentence to be edited by referring to the history DB 105*b*. The query sentence generation unit 109 acquires a search unused key corresponding to this query sentence in the history DB 105*b*. The query sentence generation unit 109 determines whether this search unused key competes in terms of dependency in the relationship of the search keys in the query sentence to be edited. When it does not compete, this search unused key is applied to the query sentence to be edited to generate a new query sentence.

Although a new query sentence is generated using the search unused key only in this example, a new query sentence may be generated in combination with the new candidate key. For example, a query sentence may be generated using the new candidate key, and the search unused key may be added to this query sentence to generate a new query sentence.

Figure 8:
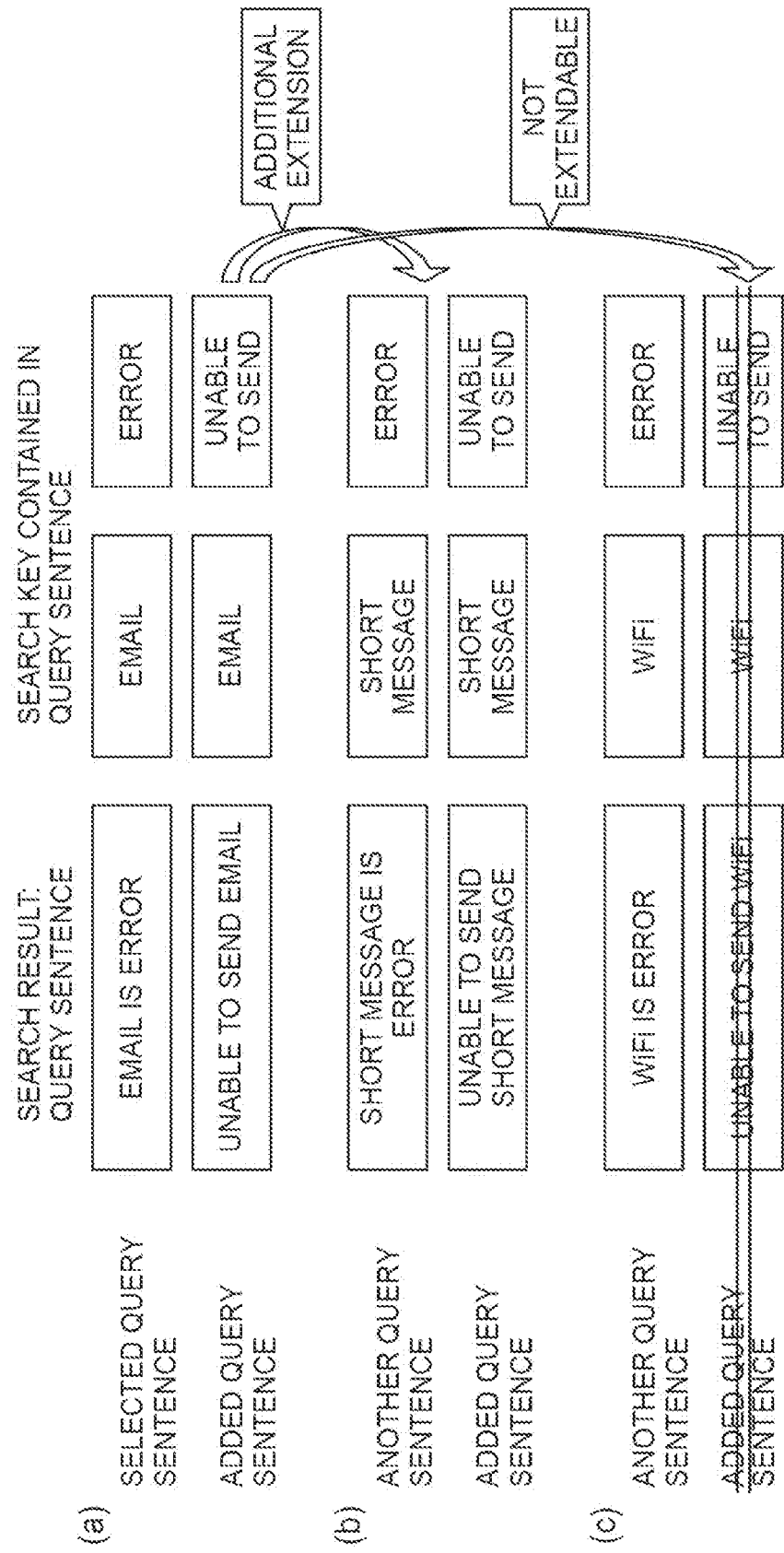
FIG. 8 is a view showing a new query sentence generation process based on another query sentence which is performed in addition to a new query sentence generation process based on one sentence.

A process that, when generating a new query sentence on the basis of a certain query sentence, generates a new query sentence in the same form on the basis of another query sentence is described hereinbelow. FIG. 8 is a view showing a process of generating a new query sentence on the basis of another query sentence which is performed in addition to a process of generating a new query sentence on the basis of one sentence.

As shown in FIG. 8(*a*), the query sentence generation unit 109 generates the new query sentence "unable to send email" on the basis of the query sentence "email is error" by referring to the history DB 105*b*. The new candidate key "unable to send" and the differential key "error" are acquired at this time.

Then, when the query sentence "short message is error" is registered in the query sentence DB 105*a* as shown in FIG. 8(*b*), the query sentence generation unit 109 generates a new query sentence "unable to send short message" on the basis of the same process as in FIG. 8(*a*).

Since the search key "error" contained in the query sentence in the query sentence DB 105*a* is common in another query sentence, a new query sentence is generated by the same rule.

Specifically, the query sentence generation unit 109 refers to the query sentence DB 105*a* and acquires a query sentence with the search key "error" by using the differential key "error" used when generating the new query sentence "unable to send email". Then, when this query sentence has the same syntax as the query sentence "email is error", a new query sentence is generated using the new candidate key "unable to send" used when generating the former query sentence in the same manner.

Note that it is important that the domain of the query sentence or the acquired key is common. For example, even if the same term "error" is contained, it is not appropriate to apply the new candidate key when the domain is different, and therefore a new query sentence is not generated in this case.

The domain indicates a category in a query sentence or each acquired key, for example. This domain is defined for each query sentence or acquired key and, for example, the domain is defined for each query sentence in the query sentence DB 105*a*. Note that a key DB for defining keys may be provided separately, and the domain may be defined for each key. In the above example, the domain "related to email" is associated with the query sentence "email is error". Further, the domain "related to email" is associated with the query sentence "short message is error". On the other hand, the domain "related to WiFi" is associated with the query sentence "WiFi is error". Thus, since the domain is different in the query sentence "WiFi is error", generation of a new query sentence based on this query sentence is not done.

Figure 9:
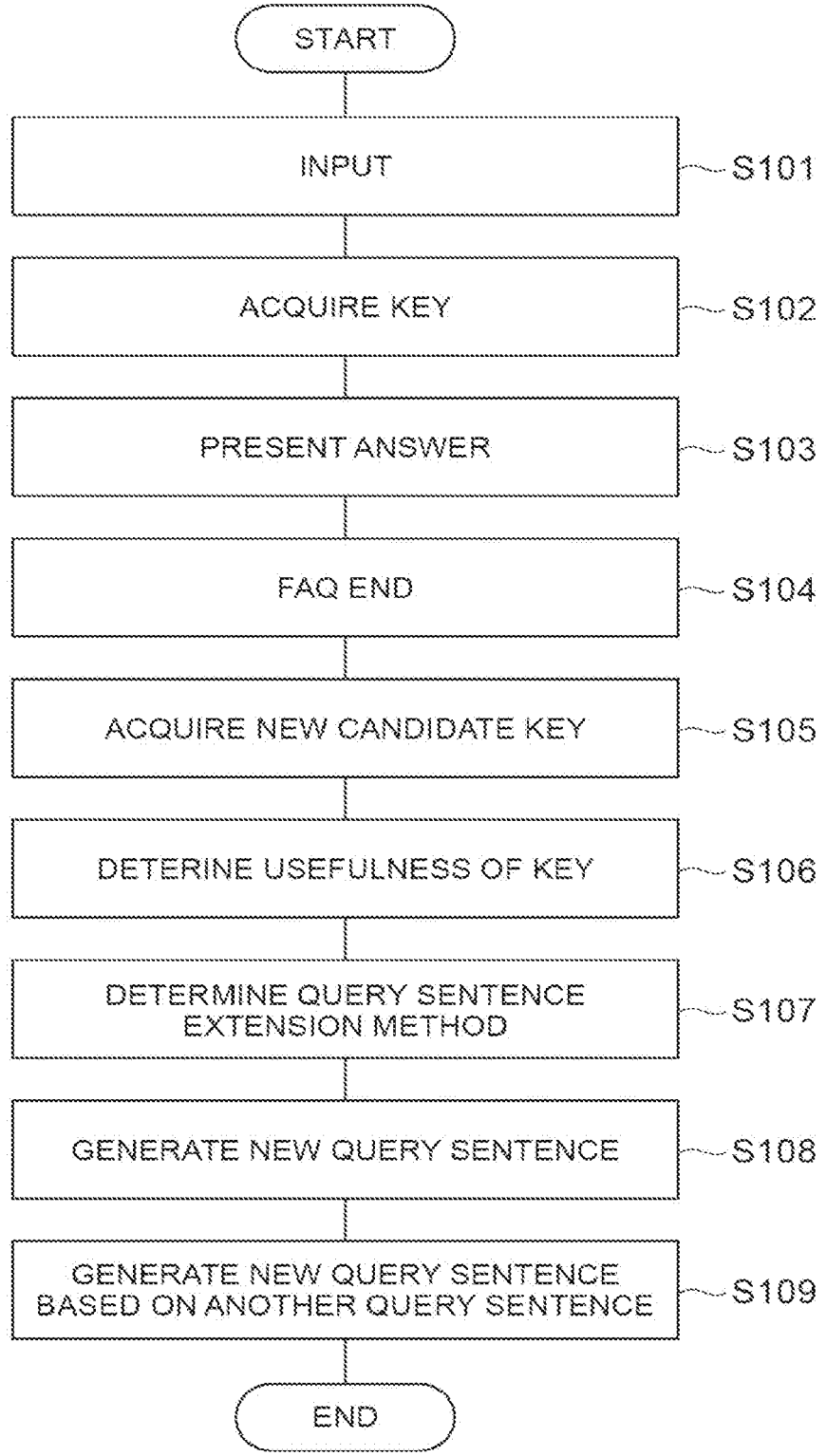
FIG. 9 is a flowchart showing the operation of the interactive system 100 that generates a new query sentence.

A process of the interactive system 100 having the above-described configuration is described hereinafter. FIG. 9 is a flowchart showing the operation of the interactive system 100 that generates a new query sentence.

The sentence acquisition unit 101 acquires an input sentence that is input by a user (S101). The key acquisition unit 102 acquires an acquired key and a new candidate key (S102). The search unit 103 searches the query sentence DB 105*a* by using the acquired key and acquires a query sentence candidate. Then, the presentation unit 104 presents the retrieved query sentence candidate to the user (S104). When the presented query sentence candidates is a desired query sentence, the user replies that it is right, and when not, the user replies that it is wrong, and the search unit 103 repeats search, replacing acquired keys from one to another. When the user obtains a desired query sentence, the FAQ process ends (S104). At the end of this process, the presentation unit 104 stores the input sentence, the acquired key, the search used key, the new candidate key, the finally reached query sentence, the search used key, and the differential key as a search history into the history DB 105b. The process up to this point is a typical query sentence search process.

The process after S105 is a process for new query sentence generation. The new query sentence generation process starts when an operator of the interactive system 100 performs an operation arbitrarily. In this example, the new candidate acquisition unit 106 first refers to the history DB 105b and selects one query sentence, which is a given search result to be edited, and refers to a record for this one query sentence. The new candidate acquisition unit 106 then acquires a new candidate key in an input sentence associated with this one query sentence (S105).

The usefulness determination unit 107 determines the usefulness of the new candidate key (S106). As described earlier, the usefulness determination unit 107 determines the usefulness of the new candidate key on the basis of whether the new candidate key has specified relevance to a differential key, whether the new candidate key is useful on the basis of history information, and so on (S106).

When it is determined that the new candidate key is useful, the extension processing unit 108 determines an extension method based on the query sentence (S107). For example, the extension processing unit 108 determines whether to generate a new query sentence by replacing a part of the existing query sentence with the new candidate key determined to be useful, to generate a new query sentence by adding the new candidate key to the existing query sentence, or to generate a new query sentence by performing both of them. The determination may be made on the basis of a preset method, or the dependency between the acquired key and the differential key and the dependency between the acquired key and the new candidate key.

The query sentence generation unit 109 generates a new query sentence according to the extension method determined by the extension processing unit 108 (S108). Further, the query sentence generation unit 109 refers to the history DB 105b and determines whether another query sentence is extendable on the basis of its domain, and if it is extendable, generates a new query sentence on the basis of the another query sentence (S109).

The operational advantages of the interactive system 100 according to this embodiment are described hereinafter. The interactive system 100 includes the history DB 105b that stores search history information containing an acquired key, which is a keyword acquired from an input sentence acquired by user operation, a new candidate key, which is an unknown word, and a query sentence, which is response content retrieved using the acquired key. The query sentence generation unit 109 generates a new query sentence on the basis of the search history information, by using a search key contained in the query sentence and the new candidate key.

An appropriate query sentence is thereby generated. This enables appropriate search using this query sentence and thereby reduces the number of interactions. This also reduces the processing load on the interactive system. In the case where a user terminal interacts with the interactive system 100 through a network, the traffic of this network is also reduced. In the description of the above embodiment, a query sentence, which is a search result, associated with the new candidate key in the history DB 105b is used as a query sentence to be edited; however, it is not limited thereto, and a new query sentence may be generated on the basis of a specified template by using the search key and the new candidate key.

Further, in the interactive system 100, the query sentence generation unit 109 generates the new query sentence by replacing a search key in the query sentence with the new candidate key.

Further, the interactive system 100 further includes the usefulness determination unit 107 that determines the usefulness of the new candidate key. The query sentence generation unit 109 generates a new query sentence by using the new candidate key that is determined to be useful by the usefulness determination unit 107.

This allows selecting an appropriate new candidate key and generating a query sentence using it. This prevents generation of a query sentence that is not consistent with the purpose.

Further, in the interactive system 100, the usefulness determination unit 107 acquires, as a differential key, a key not contained in the input sentence among search keys contained in the query sentence, and when there is relevance between this differential key and the new candidate key, determines that the new candidate key is useful.

For example, the usefulness determination unit 107 determines that there is relevance between the differential key and the new candidate key when they are quasi-synonyms, they belong to the same category, the degree of similarity is high, or the distance between words is a predetermined value or less.

This allows selecting an appropriate new candidate key.

Further, in the interactive system 100, the usefulness determination unit 107 determines the usefulness of the new candidate key on the basis of the dependency between a search used key used for acquiring the query sentence and the new candidate key and the dependency between the search used key and the differential key.

This allows selecting a new candidate key with the same dependency and thereby selecting a more appropriate new candidate key, which enables new generation of an appropriate query sentence that is consistent with the purpose.

Further, in the interactive system 100, the usefulness determination unit 107 acquires the frequency that the query sentence to be edited is reached from an input sentence containing the new candidate key. In the above-described embodiment, the frequency is acquired on the basis of information stored in the history DB 105b. The usefulness determination unit 107 then determines the usefulness of the new candidate key on the basis of this frequency. For example, when the frequency is a predetermined value or more, it can be determined that many users have agreed with a query sentence from this input sentence. Thus, generating a new query sentence based on the new candidate key in this input sentence leads to a useful query sentence for many users.

Further, the usefulness determination unit 107 acquires, as a differential key, a key not contained in the input sentence among search keys contained in the query sentence, and acquires the frequency that the query sentence containing the differential key or another sentence is reached from the input sentence containing the new candidate key, and determines the new candidate key to be useful on the basis of this frequency. Specifically, in the case where attention is focused on the new candidate key "unable to send" and the differential key "error", when the input sentence contains the new candidate key "unable to send" and search keys in the query sentence include the differential key "error", the usefulness of the new candidate key is determined on the basis of the frequency that the query sentence is obtained by replacement regardless of the input sentence and content of the query sentence obtained from the input sentence.

Further, in the interactive system 100, the query sentence generation unit 109 generates another new query sentence by using another query sentence in the same domain as the query sentence and the new candidate key. For example, another new query sentence is generated by editing another query sentence in the same domain (category) with the new candidate key. This allows effectively extending the generation of a new query sentence.

Further, in the interactive system 100, the search unit 103 searches for a query sentence on the basis of a plurality of acquired keys acquired from an input sentence acquired by user operation, and stores the query sentence together with a search unused key not used in search and the like into the history DB 105b. The query sentence generation unit 109 generates new response content by using the search unused key not used in search among the plurality of acquired keys.

This allows generating a new query sentence without limitation to a new candidate key. The search unused key is considered as an important key when obtaining the query sentence.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 10:
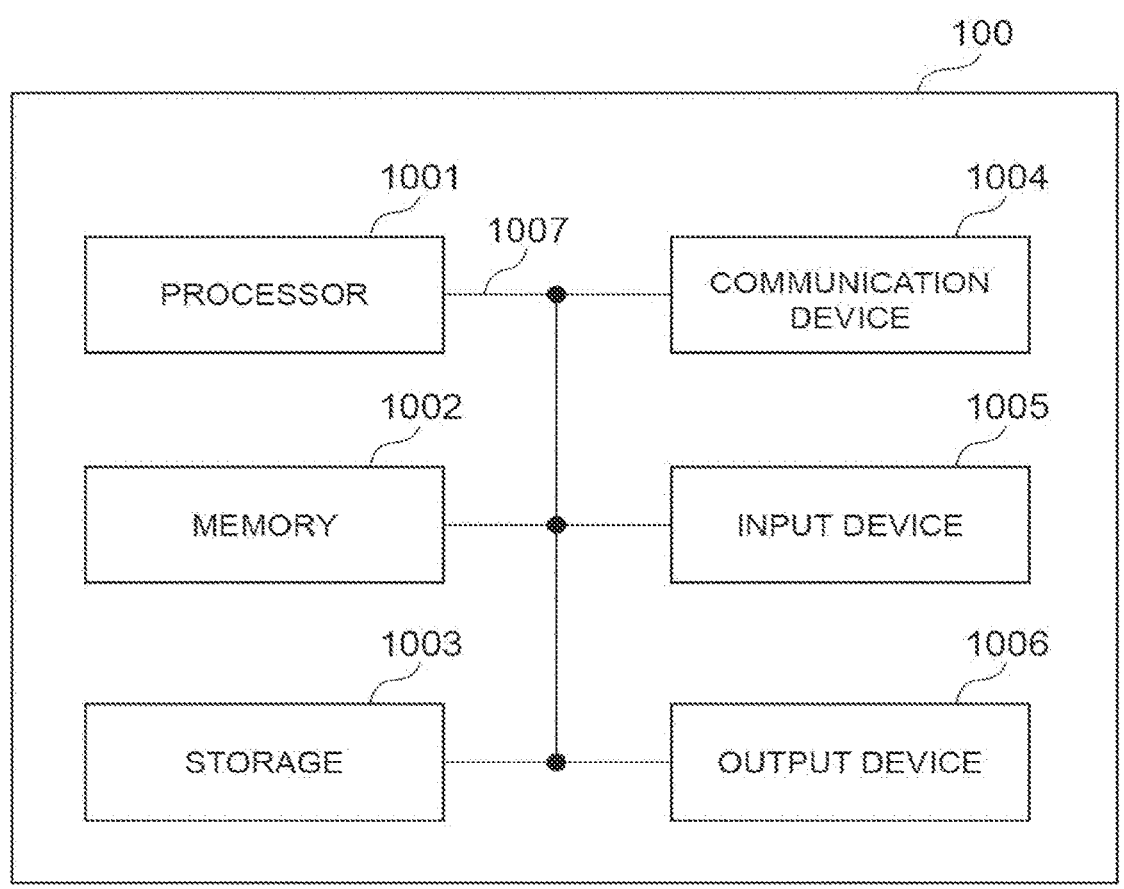
FIG. 10 is a view showing an example of a hardware configuration of the interactive system 100 according to one embodiment of the present disclosure.

For example, the interactive system 100 according to one embodiment of the present disclosure may function as a computer that performs processing of a query sentence generation method in an interactive process according to the present disclosure. FIG. 10 is a view showing an example of the hardware configuration of the interactive system 100 according to one embodiment of the present disclosure. The interactive system 100 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the interactive system 100 may be configured to include one or a plurality of the devices shown in the drawings or may be configured without including some of those devices.

The functions of the interactive system 100 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the sentence acquisition unit 101, the key acquisition unit 102, the search unit 103, the new candidate acquisition unit 106, the usefulness determination unit 107, the extension processing unit 108, the query sentence generation unit 109 and the like described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the new candidate acquisition unit 106 in the interactive system 100 and the like may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing an interactive processing method according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example. For example, the above-described sentence acquisition unit 101, presentation unit 104 or the like may be implemented by the communication device 1004. The sentence acquisition unit 101 and the presentation unit 111 may be implemented in a physically or logically separate manner, or may be implemented as one device.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the interactive system 100 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

Notification of information may be made by another method, not limited to the aspects/embodiments described in the present disclosure. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

Further, each of the aspects/embodiments described in the present disclosure may be applied to at least one of a system using LTE (Long Tenn Evolution), LTE-A (LTE Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), or another appropriate system and a next generation system extended on the basis of these systems. Further, a plurality of systems may be combined (e.g., a combination of at least one of LTE and LTE-A, and 5G) for application.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning For example, at least one of a channel and a symbol may be a signal (signaling). Further, a signal may be a message. Furthermore, a component carrier (CC) may be called a cell, a frequency carrier, or the like.

The terms "system" and "network" used in the present disclosure are used to be compatible with each other.

In the present disclosure, the terms such as "Mobile Station (MS)" "user terminal", "User Equipment (UE)" and "terminal" can be used to be compatible with each other.

The mobile station can be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. For example, "connect" may be replaced with "access". When used in the present disclosure, it is considered that two elements are "connected" or "coupled" to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description "on the basis of" used in the present disclosure does not mean "only on the basis of" unless otherwise noted. In other words, the description "on the basis of" means both of "only on the basis of" and "at least on the basis of".

Furthermore, "means" in the configuration of each device described above may be replaced by "unit", "circuit", "device" or the like.

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C". The terms such as "separated" and "coupled" may be also interpreted in the same manner

REFERENCE SIGNS LIST

100 . . . interactive system, 101 . . . sentence acquisition unit, 102 . . . key acquisition unit, 103 . . . search unit, 104 . . . presentation unit, 105 . . . storage unit, 105a . . . query sentence DB, 105b . . . history DB, 106 . . . new candidate acquisition unit, 107 . . . usefulness determination unit, 108 . . . extension processing unit, 109 . . . query sentence generation unit

The invention claimed is:

1. An interactive system comprising:
a history database, a content response database and processing circuitry;
the content response database stores content responses;
the history database stores acquired keys, new candidate keys, and previous content responses, wherein the acquired keys, the new candidate keys, and the previous content responses are keys used by users when the users previously conducted a search by using the content response database;
the processing circuitry being configured to
perform an interaction with a user to respond to a user query, by automatically acquiring an acquired key being a keyword acquired from an input sentence acquired by user operation, a new candidate key being an unknown word or phrase that is not previously registered in a database and is acquired from the input sentence, and a content response retrieved using the acquired key,
present the retrieved content response to the user, and
when the interaction with the user is complete, automatically generate a new content response on the basis of a search key that is a word or phrase used to search for the retrieved content response and is contained in the retrieved content response and the new candidate key,
wherein the new generated content response is added to the content response database,
allowing for subsequent searches using the newly generated content response,
wherein the processing circuitry is configured to determine usefulness of the new candidate key,
generate a new query sentence by using the new candidate key determined as useful,
acquire, as a differential key, a key among search keys contained in the content response that is also not contained in the input sentence, and
when there is relevance between the differential key and the new candidate key, the processing circuitry determines that the new candidate key is useful.

2. The interactive system according to claim 1, wherein the processing circuitry generates the new content response by replacing the search key in the content response with the new candidate key.

3. The interactive system according to claim 2, wherein the processing circuitry generates another new content response by using another content response in the same domain as the content response and the new candidate key.

4. The interactive system according to claim 1, wherein the processing circuitry determines that there is relevance when the differential key and the new candidate key are quasi-synonyms, belong to the same category, have a high degree of similarity, or have a distance between words being equal to or less than a predetermined value.

5. The interactive system according to claim 4, wherein the processing circuitry determines usefulness of the new candidate key on the basis of dependency between a search used key used for acquiring the response content and the new candidate key and dependency between the search use key and the differential key.

6. The interactive system according to claim 4, wherein the processing circuitry generates another new content response by using another content response in the same domain as the content response and the new candidate key.

7. The interactive system according to claim 1, wherein the processing circuitry determines usefulness of the new candidate key on the basis of dependency between a search used key, that is the search key previously used for acquiring the content response and the new candidate key and dependency between the search used key and the differential key.

8. The interactive system according to claim 7, wherein the processing circuitry generates another new content response by using another content response in the same domain as the content response and the new candidate key.

9. The interactive system according to claim 1, wherein the processing circuitry
   acquires frequency that the content response was previously reached from at least one previously received input sentence containing the new candidate key in search history information describing a search history, and
   determines the new candidate key to be useful on the basis of the frequency.

10. The interactive system according to claim 9, wherein the processing circuitry generates another new content response by using another content response in the same domain as the content response and the new candidate key.

11. The interactive system according to claim 1, wherein the processing circuitry generates another new content response by using another content response in the same domain as the content response and the new candidate key.

12. The interactive system according to claim 1, wherein the processing circuitry generates another new content response by using another content response in the same domain as the content response and the new candidate key.

13. The interactive system according to claim 1, wherein the processing circuitry generates another new content response by using another content response in the same domain as the content response and the new candidate key.

14. An interactive system comprising:
    a history database, a content response database and processing circuitry;
    the content response database stores content responses;
    the history database stores acquired keys, new candidate keys, and previous content responses, wherein the acquired keys, the new candidate keys, and the previous content responses are keys used by users when the users previously conducted a search by using the content response database;
    the processing circuitry being configured to
    perform an interaction with a user to respond to a user query, by automatically acquiring a plurality of acquired keys being keywords acquired from an input sentence acquired by user operation and a content response retrieved using a certain acquired key among the plurality of acquired keys,
    present the retrieved content response to the user, and
    when the interaction with the user is complete, automatically generate a new content response by using a search unused key that is a word or phrase not previously used to search for the content response among the plurality of acquired keys,
    wherein the new generated content response is added to the content response database, allowing for subsequent searches using the newly generated content response,
    wherein the processing circuitry is configured to determine usefulness of the new candidate key,
    generate a new query sentence by using the new candidate key determined as useful,
    acquire, as a differential key, a key among search keys contained in the content response that is also not contained in the input sentence, and
    when there is relevance between the differential key and the new candidate key, the processing circuitry determines that the new candidate key is useful.

15. An interactive system comprising:
    a history database, a content response database and processing circuitry;
    the content response database stores content responses,
    the history database stores acquired keys, new candidate keys, and previous content responses, wherein the acquired keys, the new candidate keys, and the previous content responses are keys used by users when the users previously conducted a search by using the content response database,
    processing circuitry configured to
    access the history database, and acquire an acquired key being a keyword acquired from an input sentence acquired by user operation, a new candidate key being an unknown word or phrase that is not previously registered in a database and is acquired from the input sentence, and a content response retrieved using the acquired key,
    generate a new content response on the basis of a search key that is a word or phrase used to search for the retrieved content response and is contained in the retrieved content response and the new candidate key, and
    add the generated new content response to the content response database allowing for subsequent searches using the newly generated content response,
    wherein the processing circuitry is configured to determine usefulness of the new candidate key,
    generate a new query sentence by using the new candidate key determined as useful,
    acquire, as a differential key, a key among search keys contained in the content response that is also not contained in the input sentence, and
    when there is relevance between the differential key and the new candidate key, the processing circuitry determines that the new candidate key is useful.

* * * * *